Patented Mar. 14, 1950　　　　　　　　　　　　　　　　　　　　　2,500,593

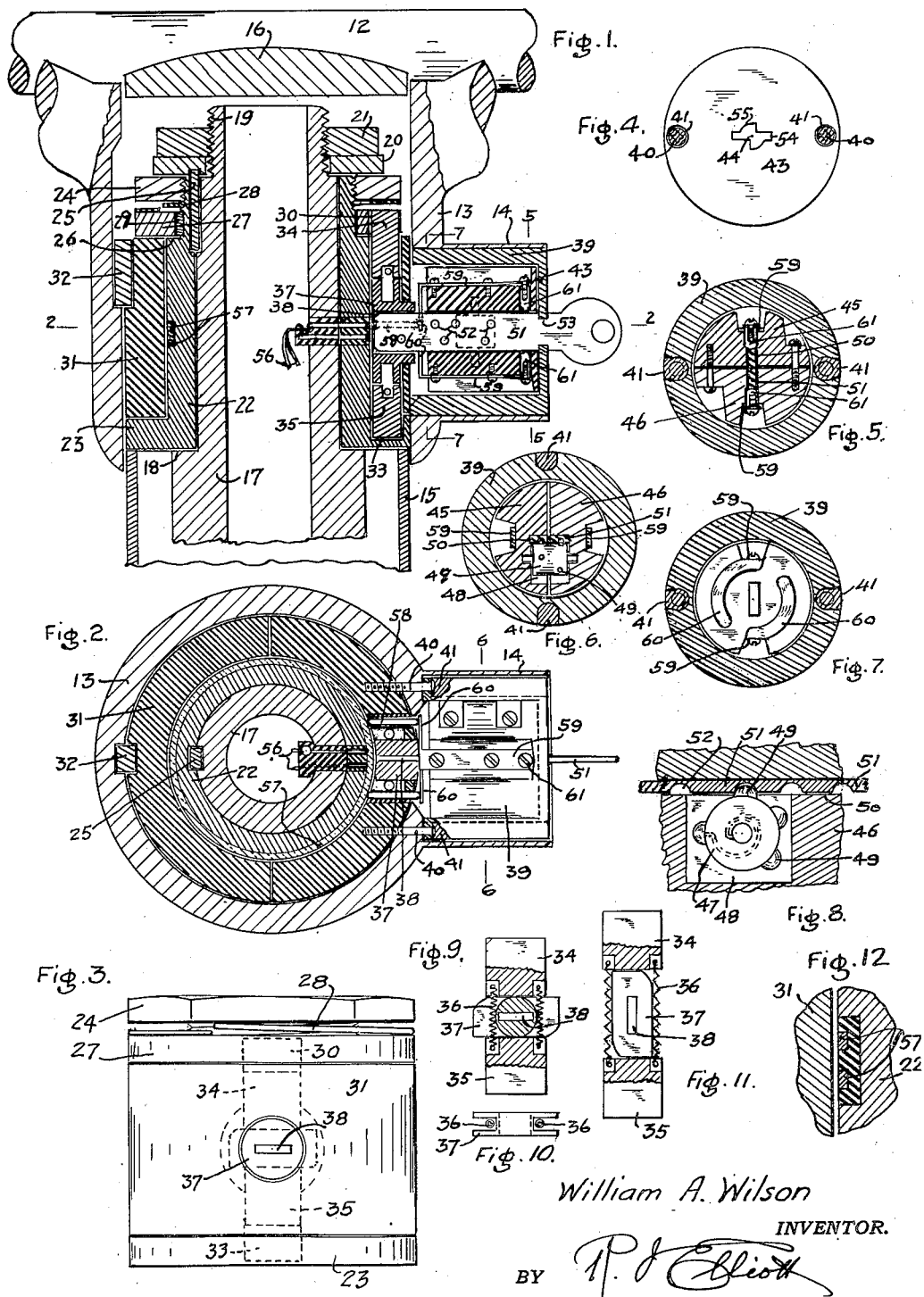

UNITED STATES PATENT OFFICE 2,500,593

STEERING WHEEL LOCK

William A. Wilson, Tacoma, Wash.

Application August 27, 1946, Serial No. 693,193

3 Claims. (Cl. 70—252)

This invention relates to locking or releasing the steering wheel of an automobile, or other vehicle, or the operating wheel of any other mechanism such as a valve, in order to prevent its unauthorized use. My invention comprises certain structural arrangements whereby the steering wheel may be released from the steering post, when the car is parked, and cannot again be put in connection therewith without the operation of the lock; further my invention comprises certain improvements in the locking member whereby the car lock, while of extremely simple construction, would be very difficult to operate except by a duplicate of the key belonging to that particular car lock, thus insuring double protection against theft of the car.

The objects of my invention are to provide a means of locking a steering wheel to the steering post of the car for normal use; a means of unlocking such connection when the car is parked, so that it is impossible to steer the car when the wheel is unlocked; a means of preventing the negligent leaving of the key in the lock when the engine is stopped; a means of connecting the ignition system of the car with the locking mechanism so that the insertion of the key into the lock will enable the engine to be started without locking the steering wheel to the steering post, and so that the engine may be operated as long as the key is in the lock.

Further objects of my invention are to provide a mechanism which is thoroughly protected from being tampered with; which is strong and of rugged construction, and effective in use.

I attain these and other objects as will be apparent to those familiar with the art, by the devices, mechanisms, and arrangements illustrated in the accompanying drawings, in which—

Fig. 1 is a vertical section of the steering head showing the parts in the positions occupied thereby when the wheel is locked to the steering post, otherwise known as the normal position; Fig. 2 is a horizontal cross-section thereof taken on the line 2—2 in Fig. 1; Fig. 3 is a front elevation of the wheel-lock mechanism when removed from the steering wheel and post; Fig. 4 is an elevation of the outer plate of the lock, showing the key hole therein; Fig. 5 is a section of the lock taken on the line 5—5 in Fig. 1; Fig. 6 is a section thereof taken on the line 6—6 in Fig. 2 and showing the key-blocking wheel; Fig. 7 is a section taken on the line 7—7 in Fig. 1 and showing the ignition contact arcs; Fig. 8 is an enlarged partial section showing the key and the key-blocking wheel; Fig. 9 and 10 show the lock bolt, unlocked, and Fig. 11 shows it locked; Fig. 12 is a fragmentary sectional view showing the contact rings in section.

Similar numerals of reference refer to similar parts throughout the several views.

Several attempts have been made to provide the steering wheel of the car with a locking means which would be releasable when the car is parked, thus preventing a thief from driving away because of his inability to steer it when the steering wheel is disconnected from the steering post. One of the defects of most such attempts is that they are more or less exposed and can be tampered with by a clever thief, or rendered ineffective, and it has been one of my objects to so construct the wheel locking mechanism and the lock therefor in such manner that it would be extremely difficult to effectively tamper with them, or to make a key which would operate the lock.

Referring to the drawings, the steering wheel 12 is of the usual construction and is provided with a central hub 13 which completely covers the following described wheel lock mechanism, and said hub 13 is also provided with a lock container 14 which branches off from the hub 13 and is adapted to hold the key-controlled lock. The hub 13 extends down over the top of the fixed steering column or post 15. A suitable horn button 16 is supported on top of the center of the hub 13 and is to be understood as being operable to sound the horn.

The steering post 17 is hollow and extends up in the said column 15 and into the said hub 13. A shoulder 18 is formed around the outside of the post 17 at a point substantially in line with the top of the column 15. The upper end of the post 17 is screw-threaded at 19, to receive the holding washer 20 and nut 21.

An inner sleeve 22 fits down over the reduced part of the post 17. The lower end of this sleeve 22 is provided with a collar or flange 23, which extends outward therefrom until it is of the same diameter as is the fixed column 15 and lies immediately above said column. The upper end of the sleeve 22 extends into contact with the washer 20 and is screw-threaded to receive the lower nut 24. A key or pin 25 secures the inner sleeve 22 to the steering post 17. Thus it will be seen that the sleeve 22 turn with the steering post 17. The upper end of the sleeve 22, below the nut 24 is reduced in diameter to form a shoulder 26.

A lock ring 27 is mounted on the said shoulder 26, and a spring lock washer 28 lies between the ring 27 and the lower surface of the nut 24 to keep the said nut from loosening. A second key 29 is placed between the said ring 27 and the reduced end of the sleeve 22 so that the said ring turns on its axis only with the turning of the steering post 17. This ring 27 has a lock slot 30 adapted to receive the upper lock bolt hereinafter described, by which the steering post 17 is locked to the steering wheel 12.

A second or outer sleeve 31 is made of two equal parts and fits around the inner sleeve 22 and rests on the flange 23 thereof, and is of the same diameter as the said flange. This sleeve 31 is connected to the hub 13 by means of a key 32. A vertical slot is formed in the inner surface of the sleeve 31, at a point opposite the key-lock mechanism hereinafter described, in which the upper and lower lock bolts are mounted. The upper lock bolt is adapted to move from this slot upward into the slot 30 of the ring 27, and the lower said lock bolt moves downward into a slot 33 in the flange 23 of the inner sleeve 22. Thus it will be seen that the post 17 and the wheel 12 are locked together when the upper and lower lock bolts are in engagement respectivly with the slot 30 of the ring 27, and the slot 33 in the flange 23, and that they are disconnected, so as to permit the free turning of the wheel 12 without turning the post 17, when the said upper and lower lock bolts are withdrawn from the slots 30 and 33 and rest only in the slot in the sleeve 31.

Referring now to Figs. 9, 10 and 11 which illustrate the lock bolts, it will be seen that the upper lock bolt 34 and the lower lock bolt 35 are connected together by a pair of springs 36 and are separated by a cam 37 having a central flat key-slot 38 therein. This cam 37 is mounted in the slot in the outer sleeve 31 between the bolts 34 and 35. When the cam 37 is turned so that the key slot 38 is horizontal, the lock bolts 34 and 35 are withdrawn from the slots 30 and 33, and in this position the operating key may be withdrawn from the lock, as the car is parked or idle, but if the cam is turned through one-quarter revolution and the slot 38 is vertical, the bolts 34 and 35 are both extended into said slots 30 and 33 and the wheel 12 is then locked to the steering post 17, as above described. It will be noted that the cam 37 has four flat surfaces against which the inner ends of said bolts 34 and 35 rest in the respective withdrawn and extended positions, thus preventing the bolts from accidentally slipping out of the desired positions.

Referring now to Figs. 1, 2, 3, 4, 5, 6, 7 and 8 in which the key operated means of operating said lock cam 37 is illustrated. The hub 13 of the steering wheel 12 is provided with a lock container 14 extending out at right angles to the axis of the hub 13, and adapted to enclose the lock-operating mechanism, which is contained in the lock casing 39. This lock casing 39 is secured in the container 14 by means of two screws 40 located at the bottom of the two slots 41 (Fig. 2). The slots 41 may be suitably blocked to prevent unauthorized access to the screws 40. By removing the screws 40 the entire key lock may be removed from the hub container 14 for repair if desired.

This lock operating mechanism comprises a fixed outer shell 39, which fits in the lock container 14, and which has an outer plate 43 integral with the shell 39. The plate 43 is provided with the slots 41 and with the key hole 44, hereinafter described. The shell 39 contains an inner lock barrel composed of two separate pieces 45 and 46, of insulating material, which are revolubly mounted therein.

As seen in Figs. 6 and 8, a safety wheel 47 is mounted in a cavity 48 formed in the two parts 45 and 46. Said safety wheel 47 is provided with a plurality of teeth or protuberances 49, which may be positioned at any points of its surface. These teeth 49 extend out from the wheel or drum 47, across the key slot 50, which passes axially and centrally through both of the parts 45 and 46 of the revoluble lock barrel, in such manner that no key not equipped with holes or depressions corresponding exactly with the said teeth 49 may pass the wheel 47, because in passing the wheel, the key has to turn the wheel and therefore if a tooth 49 hit a part of the key which does not have the corresponding depression, the said tooth jams into the key side and prevents its further passage into the lock.

The key slot 50 extends axially through the said parts 45 and 46 and alines with the corresponding slot 38 above described. The key 51 comprises a flat piece of metal which is provided on its side with a plurality of holes or depressions 52 which correspond exactly with the said teeth 49, as above described. Since the teeth 49 may be at any point axially on the periphery, the said depressions must also correspond in position across the flat of the key, thus giving a double check on the fit of the key to any particular lock since their positions must be accurate in position both longitudinally and transversely of the key. It will be seen in Fig. 1 that the key 51 is provided at its outer end with a pair of notches 53 into which the outer plate 43 of the fixed cylinder 42 fits when the key is turned to its operating position.

Referring now to Fig. 4 showing the cover plate 43, it will be seen that the key slot 44 therethrough is longer in the horizontal dimension 54 than elsewhere and this dimension is equal to the transverse width of the key 51 and that the parts joining said horizontal position to the vertical position are arcuate quadrants 55 which enter the notches 53 in the key to hold the key in the lock except when the key is turned to its horizontal position, in which it may be inserted in the lock or removed therefrom. When the key is in its vertical position the wheel 12 is locked to the steering post 17.

Referring to Fig. 1, the electric circuit forming a part of the motor ignition circuit is illustrated by the two insulated wires 56 which pass up in the hollow steering post 17 and then pass through suitable insulation through said post 17 and the inner sleeve 22 where they connect with two insulated rings 57 set into the outer surface of the said inner sleeve 22. Referring, now, to Fig. 2 it will be seen that two insulated contacts 58 are mounted in the outer sleeve 31. The inner lock barrel 45, 46 is provided with two conducting strips 59 (Figs. 1, 2, 5 and 6) which lead axially, on opposite sides of the barrel, from two arcuate spring metal members 60 (Fig. 7), which press on the said two contacts 58, outward to the two key-contacts 61 (Figs. 1, 5) which engage electrically the upper and lower edges of the key 51 so long as it is in the slot 50. Thus it will be seen that simply turning the key into its "off" position does not stop the motor, therefore one cannot carelessly leave the key in the lock and shut off the engine. The key must be practically totally removed before the engine will stop, and if released from the operator's hand, will automatically drop out of the key hole. The key cannot even be started to be withdrawn until it is turned to its horizontal position because the quadrants 55 engaging the notches 53 would hold it, and when it is thus turned into horizontal position the cam 37 permits the lock bolts 34 and 35 to release the wheel 12 from its connection with the steering post 17, by the action of the springs 36.

Thus it will be seen that I have invented a means of preventing the theft of cars, since the wheel cannot be left locked to the steering post if the key is removed from the lock, and the key cannot be left in the lock if the engine ignition is turned off as it would immediately drop and, in dropping, will be observed by even the most careless or preoccupied driver. Also, it would do the unauthorized person no good to tamper with the ignition, and thus start the engine, because he could not steer the car even if he could start the engine. And, it would be extremely unlikely that a person having a car equipped with my apparatus would leave the car with the engine running, hence he would have to remove the key, and to do so he must turn it to its horizontal position and, in doing so, he must release the locking mechanism and break the connection between the wheel and the steering post.

It is, of course, understood that many changes in the details of my invention can be made without departing from the spirit thereof as outlined in the appended claims.

I claim:

1. In a wheel lock, the combination of a rotatable post; an operating wheel mounted thereon; an enveloping hub for said wheel; an inner sleeve mounted on and keyed to said post; an outer sleeve mounted in and keyed to said hub; a flange extending from the lower end of said inner sleeve and having a bolt slot therein; a ring keyed to the upper end of said inner sleeve and having a bolt slot therein in alinement with the bolt slot in said flange; a pair of lock bolts mounted in said outer sleeve and adapted to enter respectively said upper and lower bolt slots; and releasable means to project said lock bolts into said bolt slots, whereby the wheel is releasably locked to said rotatable post to turn it when said wheel is operated.

2. A wheel lock as set forth in claim 1, wherein said outer sleeve fits over said inner sleeve and is of the same outside diameter as that of the said flange on the inner sleeve, and fits inside of said hub.

3. A wheel lock as set forth in claim 1, wherein said releasable means for moving the lock bolts comprises a rotatable cam; and wherein the outward motion of said lock bolts, under the action of said cam is spring resisted.

WILLIAM A. WILSON.

REFERENCES CITED

The following references are of record in the file of this patent:

UNITED STATES PATENTS

| Number | Name | Date |
| --- | --- | --- |
| 1,248,204 | Thomsen | Nov. 27, 1917 |
| 1,317,828 | Sellstone | Oct. 7, 1919 |
| 1,699,973 | Kenworthy | Jan. 22, 1929 |

FOREIGN PATENTS

| Number | Country | Date |
| --- | --- | --- |
| 204,918 | Canada | Oct. 19, 1920 |